United States Patent [19]
Hynes

[11] Patent Number: 6,016,856
[45] Date of Patent: Jan. 25, 2000

[54] TRACTION DEVICE FOR TIRES

[76] Inventor: John Hynes, 739 E. 242 St., Bronx, N.Y. 10470

[21] Appl. No.: 09/030,795

[22] Filed: Feb. 26, 1998

[51] Int. Cl.[7] .................................................. B60C 27/20
[52] U.S. Cl. ........................................ 152/190; 152/226
[58] Field of Search .................................. 152/170, 178, 152/181, 185, 186, 190, 213 R, 217, 218, 219, 225 R, 226, 232, 233, 236, 237

[56] References Cited

U.S. PATENT DOCUMENTS

| | | | |
|---|---|---|---|
| 2,470,607 | 5/1949 | Dritz | 152/233 X |
| 3,856,068 | 12/1974 | Callaghan et al. | 152/190 X |
| 4,226,272 | 10/1980 | Deluty | 152/226 X |
| 4,378,833 | 4/1983 | Lindblad et al. | 152/226 |

Primary Examiner—Russell D. Stormer
Attorney, Agent, or Firm—MGM & Associates; Jack Schwartz

[57] ABSTRACT

The present invention relates to an anti-skid traction device designed to be easily mounted onto a wheel of a motor-vehicle for obtaining greater traction on ice, snow, mud, or sand. One embodiment of the invention is for uses in situations where an automobile has been impaired by road conditions. Another embodiment of the invention is for uses as a road travel device designed for more continuous use where supplemental traction is desired on a long-term basis. Another embodiment of the invention is for use by trucks and other heavier vehicles in severe road conditions. All the embodiments of the present invention are designed to replace snow chains which have already been outlawed except for use on emergency vehicles. The invention disclosed herein provides safety for the road, the environment and the user, in a cost effective manner.

6 Claims, 2 Drawing Sheets

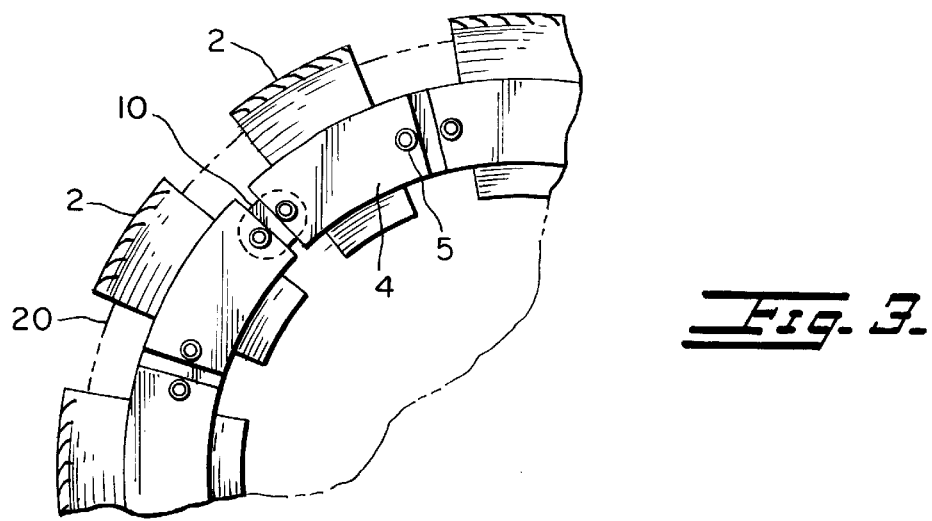
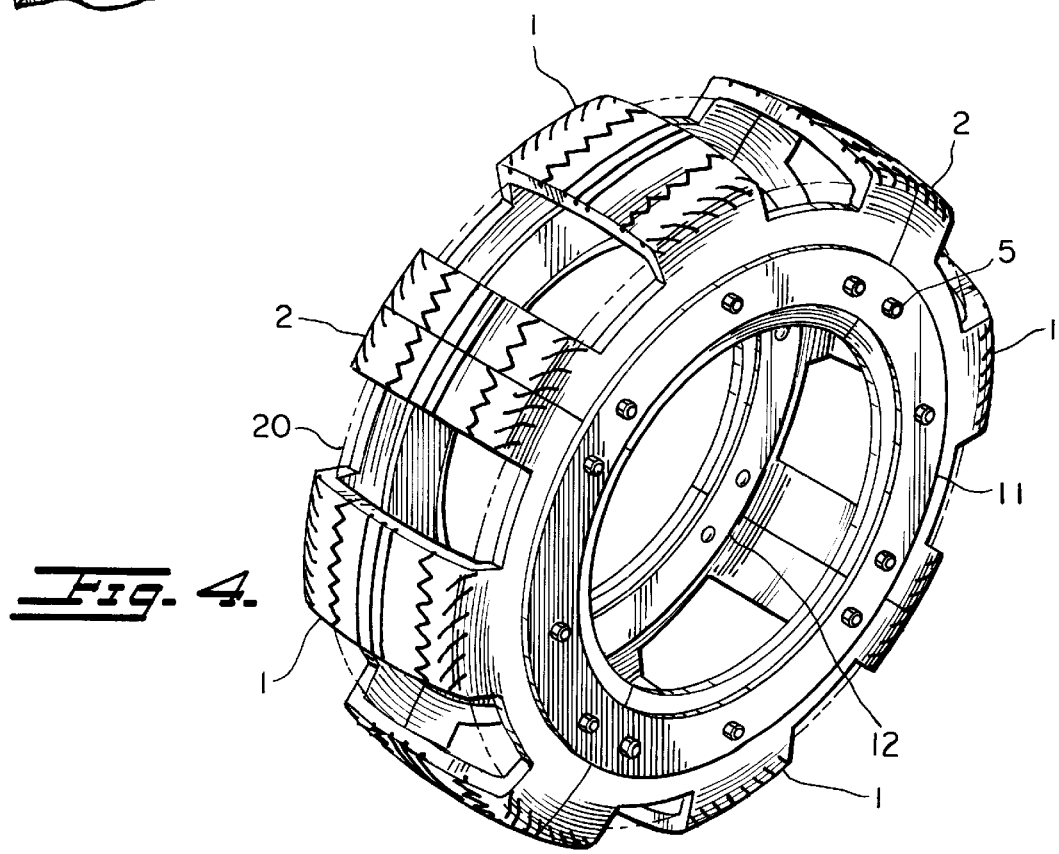

TRACTION DEVICE FOR TIRES

INDEX

Field Of The Invention
Background Of The Invention And
  Description Of The Prior Art
Summary And Objects Of The Invention
Brief Description of the Drawings
Detailed Description Of The Invention In A Preferred
  Embodiment
Claims
Abstract Of The Disclosure

FIELD OF THE INVENTION

The present invention relates to an anti-skid traction device designed to be easily mounted onto a wheel of a motor-vehicle for obtaining greater traction on Ice, snow, mud, or sand. One embodiment of the invention is for uses in situations where an automobile has been impaired by road conditions. Another embodiment of the invention is for uses as a road travel device designed for more continuous use where supplemental traction is desired on a long-term basis. Another embodiment of the invention is for use by trucks and other heavier vehicles in severe road conditions. All the embodiments of the present invention are designed to replace snow chains which have already been outlawed except for use on emergency vehicles. The invention disclosed herein provides safety for the road, the environment and the user, in a cost effective manner.

BACKGROUND OF THE INVENTION AND DESCRIPTION OF THE PRIOR ART

There are presently known numerous types of anti-skid traction devices but none have the particular claimed advantages of the present invention. Present day tire attaching traction devices consist of either steel studs applied directly to the tires or chains manually wrapped around the tires of the vehicle. The former must be installed one at a time by means of special machines and, once applied, are usually left in place for the entire life of the tire. Furthermore, they cannot be applied to tires which do not have the required tread depth, thus limiting further their utilization. The latter, while removable at one's desire, necessitate strenuous manual work and skill in their application to the tires. Furthermore, the chain links are quite susceptible of breakage with resultant damage to the fenders and underbody of the vehicle.

A search of the state of the art of the tire attaching traction device industry uncovered the following patents: U.S. Pat. No. 5,1115,851 to Chiavatti in in 1992 entitled TIRE TRACTION DEVICE; U.S. Pat. No. 5,103,885 to Chang in 1992 entitled CABLE CHAIN FOR AUTOMOBILE TIRE; U.S. Pat. No. 4,919,182 to Proulx in 1990 entitled MOTOR VEHICLE EMERGENCY TIRE TRACTION IMPROVEMENT DEVICE etc.; U.S. Pat. No. 4,643,251 to Ziccardi in 1987 entitled TRACTION DEVICE FOR AUTOMOBILE WHEELS; U.S. Pat. No. 4,886,100 to Parker in 1989 entitled TRACTION DEVICE etc.; U.S. Pat. No. 4,825,923 to Blankenship in 1989 entitled TRACTION CABLE; U.S. Pat. No. 4,304,280 to Lew in 1981 entitled EASY TO INSTALL CONTINUOUS SNOW CHAIN; U.S. Pat. No. 4,207,939 to Motosko in 1980 entitled TRACTION DEVICE; U.S. Pat. No. 4,155,391 to Dieck entitled TIRE TRACTION DEVICE; U.S. Pat. No. 4,129,161 to Quintana in 1978 entitled TRACTION DEVICE FOR TIRES; U.S. Pat. No. 4,120,336 to Beskall In 1978 entitled TRACTION DEVICE FOR POWER DRIVEN VEHICLES; U.S. Pat. No. 3,850,216 to Santivale in 1974 entitled TIRE ATTACHMENT FOR TRACTION ON ICE OR SNOW; U.S. Pat. No. 3,756,613 to Rutley in 1973 entitled TRACTION APPARATUS FOR VEHICLE TIRES; U.S. Pat. No. 3,672,422 to Greipel in in 1972 entitled VEHICLE TRACTION DEVICE; U.S. Pat. No. 3,630,440 to Sams in 1971 1991 entitled EXACTO-O-LIFTER.

Whatever their claimed advantages, none of these prior patents discloses a tire attaching traction device which is easy to apply, and can be mass-produced at low cost from used tires. Since the invention herein is made of rubber itself it is does not damage the road while it functions to give its user better traction on ice, snow, mud, or sand. When compared to the presently known traction devices, this inventive device is less costly and less complicated to use while providing the safety sought In adverse road weather conditions. Another important advantage in the present Invention is that the tire traction device disclosed herein utilizes recycled material, particularly tires which are a considerable problem for landfills. Therefore, the present invention is environmentally friendly. This is a very big concern in the world today due to the decreasing landfill space, and the increasing pressure of local municipalities to re-cycle more material each year. The present invention, when mass produced, will require large quantities of used tires, thus removing them from landfill space, and from illegal dumping grounds. Prior known traction devices are neither road nor environmentally friendly. These and other disadvantages experienced with the prior art devices, have thus been obviated by the improved tire traction device now disclosed.

In sum, although useful for their own purposes and in their own times, no known prior art discloses a useful, effective, road friendly tire traction device which is road safe and environmentally protective at the same time.

SUMMARY AND OBJECTS OF THE INVENTION

The tire traction device disclosed herein addresses the above needs and concerns in the following manner.

It is, therefore, an object of the invention to eliminate present day disadvantages by providing a traction device for tires which is easily and rapidly mounted and detached, regardless of the tire involved and regardless of the vehicle in question, truck or automobile.

Another object of the invention is to provide an attachment for tires for traction on ice or snow, which may be attached to and detached from the tire by any person without the need of any tools.

A still further object of the invention is to provide a traction device which uses recycled tire materials.

Another object of the present invention is to provide a traction device which has high stability while being road friendly.

It is another object of the invention to provide a traction device which is wheel and tire friendly.

A still further object of the invention is to provide a traction device which is small in size and can easily fit into the trunk of a car.

Another object of the present invention is to provide a traction device which is adjustable to fit tires of all sizes.

A further object of the present invention is to provide a traction device which is inexpensive both the manufacturer and the final consumer.

Other objects, advantages and novel features of the tire traction device herein disclosed will become readily apparent to those skilled in the art from the following detailed description when considered In conjunction with the attached drawings wherein like reference numbers identify like parts throughout.

BRIEF DESCRIPTION OF THE DRAWINGS

A better understanding of the Invention will become readily apparent from the following detailed description thereof with reference to the accompanying drawings, in which:

FIG. 3 is a partial elevational view disclosing another embodiment of the present invention where two pairs of the tire traction devices shown in FIG. 1 are mounted on the same tire without the use of straps by way of four connecting links or clips which are adjustable to accommodate varying wheel sizes;

FIG. 4 is an isometric view of a third embodiment of the invention wherein four separate tire traction devices are attached adjacent to on another on a wheel for more continuous use and held onto said tire wheel by way of inner and outer plates.

DETAILED DESCRIPTION OF THE INVENTION IN A PREFERRED EMBODIMENT

Figure 1:
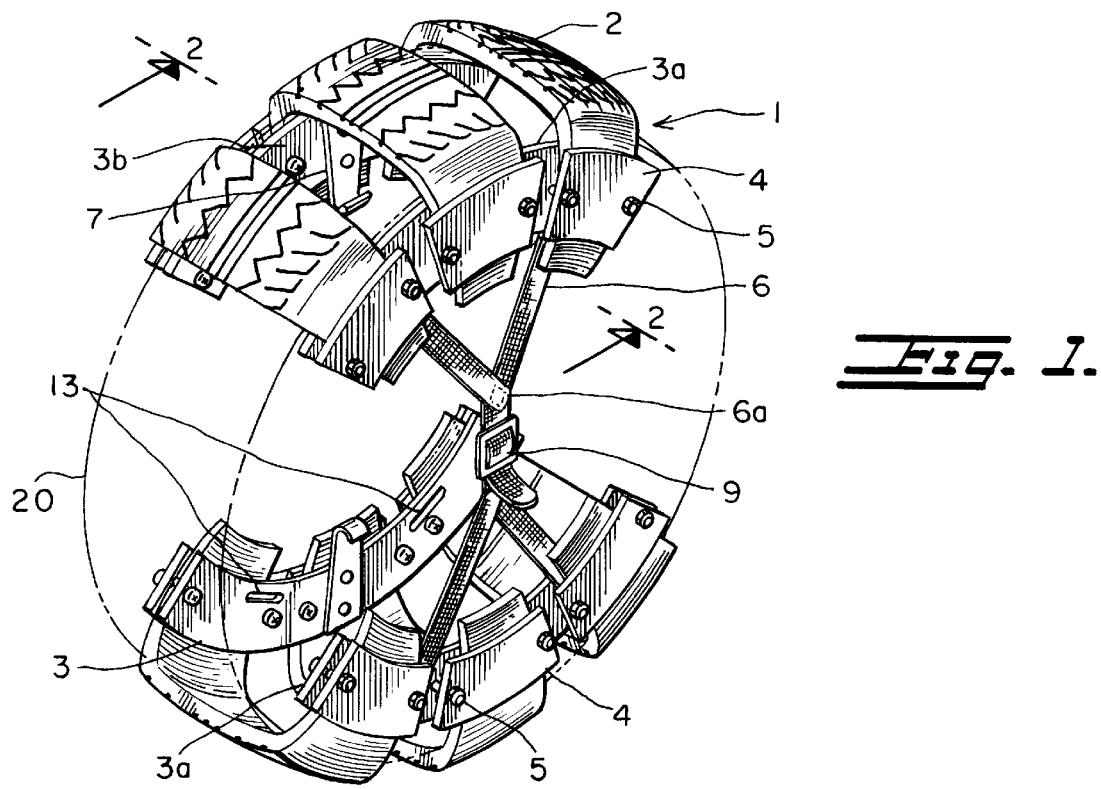
FIG. 1 is a isometric view of the tire traction device of this invention as it is seen attached to a motor vehicle tire shown in phantom.

Referring now more specifically to the drawings, FIGS. 1 discloses one preferred embodiment of the tire traction device 1 of the present invention. This embodiment is designed for "emergency" uses during which a motor vehicle has been impaired by adverse road conditions. This embodiment of the tire traction device 1 would be carried in the trunk of a car as a piece of emergency equipment. In the event that the vehicle does become stuck in snow mud, sand or ice the driver of the vehicle can simply retrieve the traction device 1, and in a matter of moments have this new and improved traction device installed on the driving wheels of the vehicle. This device enhances the traction of the tires 20 so that the vehicle may free itself under it's own power rather than rely on the assistance of tow or other rescue vehicles which may not be available for long period of time in adverse weather conditions. Technical studies have shown that the instant traction device performs better than 10 times the known traction devices using standard snow chains.

This first embodiment, for use in emergency situations, comprises a plurality, of rubber tire cutouts 2, each of which extends across the entire outer tread and sides of a motor vehicle tire 20. Two opposing tire traction devices 1, are shown in FIG. 1, each comprising a unit of three rubber tire cutouts 2. The rubber tire cutouts 2 are cut from vehicle tires and are each approximately 3" wide and ½ to ¾" thick.

The tire cutouts 2 are held together as a single unit of a tire traction device 1, by way of two inner fastening plates 3a and 3b and individual fastening outer plates 4. The fastening plates can be made of either steel, reinforced plastic, or in one preferred embodiment, aluminum alloy. One preferred material tested for the plates was a 5052-H32 aluminum alloy which has the following properties:

Ultimate Strength ($\sigma_u$)=34,000 psi
Tensile Strength ($\sigma_y$)=27,000 psi
Elongation (%)=14%
Brlnell Hardness (#)=62
Rockwell Scale (E)=74
(15T)=15
Shear Strength (T)=20,000 psi
Endurance Limit ($\sigma_e$)=17,500 psi The most important aspects of the material used are its % elongation and its yield strength, which in the case of 5052-H32 aluminum alloy, are relatively large. Although an aluminum alloy is used for one embodiment, the fastening plates can be also be made of either steel or reinforced plastic.

The dimensions of each of the individual fastening outer plates 4 are 1/11" by 3" by 4". There also exist bending stresses on the plates 4 along with stress concentrations due to openings for receiving a fastening nut and bolt assembly 5. It is important to place the openings for receiving a fastening nut and bolt assembly 5 such that any stress concentrations are minimized but still aligned such that the plates 3a and 4 of the opposing traction devices are held together by the Nylon tm straps 6 without any fear of breakage.

A plurality of nut and bolt assemblies 5, or a similar attaching mechanisms, firmly hold the plurality of rubber tire cutouts 2 between said inner and outer plates 3a and 4 and 3b and 4. Through two slots 13, arranged on the outside inner fastening plate 3a, are attached, by known means, two Nylon tm straps 6 which connect at a point 6a and which attach firmly to the Nylon TM straps 6 of the opposing tire traction device 1, by way of a buckle 9, or similar attaching device. Each Nylon tm strap 6 is approximately 3" wide and about 3/32" to ¼" thick. It is important to place the openings for receiving the fastening nut and bolt assemblies 5 on the aluminum plates 4 such that any stress concentrations are minimized but still aligned such that the opposing plates 4 are held together by the Nylon tm straps 6 without any fear of breakage.

In the consideration of making one preferred embodiment of the invention, as disclosed in FIG. 1, one of the most important requirements for installing the straps 6 in the slots 13 of the outside inner fastening plate 3a were the accuracy, stability, elongation, and ease of installation of the straps 6. Accuracy and stability of the straps 6 ensure that the results obtained are sufficient enough, in terms of reliability. Elongation is relatively important, because it assures that if any strains become unexpectedly large, the accuracy of Nylon tm straps 6, when installed through the slots 13, on the outside inner fastening plate 3a will not be compromised. See FIG. 1a which is an exploded view of the outside inner plate 3a of FIG. 1 having two slot 13 for receiving the Nylon tm strap 6.

Figure 2:
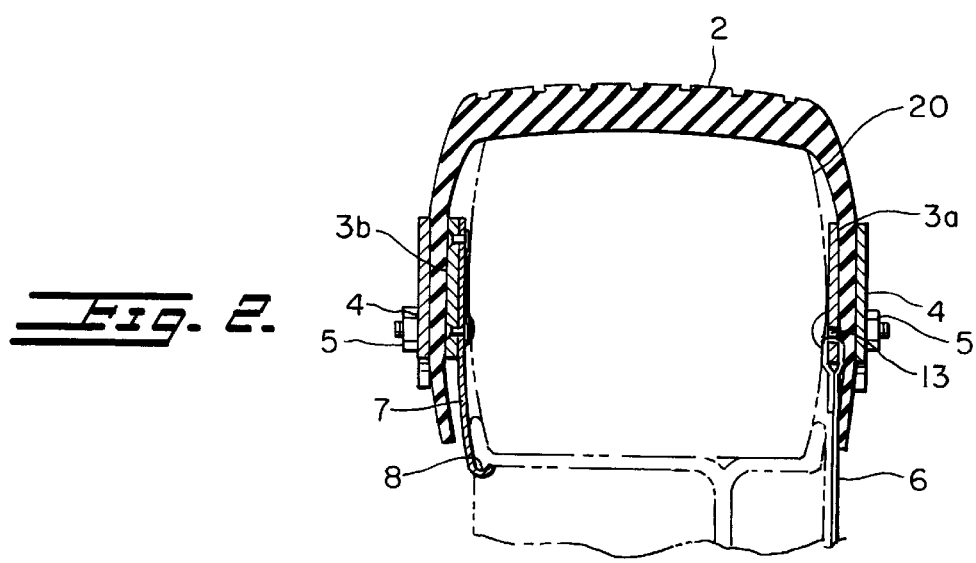
FIG. 2 is a sectional view thru line 2—2 of FIG. 1 showing the outer portion of one side of the tire traction being attached to its opposing side by way of a strap while its inner portion is attached to the inner rim of the wheel by way of a wheel clip.

FIG. 2 is a view thru line 2—2 of FIG. 1, showing inner fastening plate 3b attached to the inner rim of 8 the wheel 8 by way of said clip 7. As can be seen, inner fastening plate 3b and the outer plate 4 hold between them, by way of fastening nut and bolt assemblies 5 (cutout of this view in FIG. 2), rubber tire cutout 2, while on the other side of the tire 20, inner fastening plate 3a and the outer fastening plate 4 hold between them the other side of the rubber tire cutout 2 of the traction device 1. Attached to the center of the inside inner fastening plate 3b is a steel, reinforced plastic or aluminum clip 7 which snaps firmly onto the inner rim 8 of a tire wheel 20. A strap 6 is shown, attached inside one of the slots 13 of the outside inner fastening plate 3a, and extending downward for attachment with the buckle 9 to the opposing traction device 1 strap 6.

In FIG. 3, which shows another embodiment of the present invention, there are no straps 6 needed for attaching opposing tire traction devices 1 but an adjustable clip 10. The adjustable clip 10 can accommodate varying tire 20 sizes and connects to the nut and bolt assemblies 5 holding the inner and outer fastening plates 3*a*, 3*b* and 4 and rubber tire cutouts 2 of adjacent tire traction devices 1.

A third embodiment of the invention is shown in FIG. 4. In this embodiment, for more continuous use where supplemental traction is desired on a long-term basis, there are four, single piece units of tubber tire cutouts 2, each of which extends across the ¼ of the entire outer tread and sides of a motor vehicle tire 20 so that the entire tire is covered. These four, single piece units of rubber tire cutouts 2, are thus placed on a more permanent basis around the tire and held firmly thereto by way of a single inner fastening plate 12 and a single outer fastening plate 11 held together by way of plurality of nut and bolt assemblies 5, or a similar attaching mechanisms. While any damage to the cutouts 2 of the tire traction device shown in FIG. 1 can be corrected by simply removing the outer plates and the inner plates and replacing only the damaged portion of the cutout 2, in the embodiment of FIG. 4, an entire segment of cutouts 2 must be replaced.

Since the invention is described with reference to various preferred embodiments, and since numerous modifications and changes may become readily apparent to those skilled in the art after reading this disclosure, it should be understood that I do not wish to limit the scope of my overall invention to the exact embodiments described above and as claimed by me below:

What is claimed by me is:

1. A tire traction device for attaching to a motor vehicle tire for traction on ice, snow, mud, or sand which comprises:

a plurality of rubber tire cutouts, each of which extends a distance across the outer tread and sides of a motor vehicle tire;

two inner fastening plates, one being an inside inner fastening plate and the other, an outside inner fastening plate;

a plurality of outer fastening plates, each having two slots;

a plurality of nut and bolt assemblies, whereby the rubber tire cutouts are positioned and held firmly between said inner and outer fastening plates;

a clip; said clip is attached at the center of the inside inner fastening plate and snaps firmly onto the inner rim of a motor vehicle tire;

a plurality of Nylon tm straps and a buckle; whereby the Nylon tm straps are attached to slots arranged on the outside inner fastening plate of one tire traction device, said straps are connected with the buckle to the Nylon tm straps attached to the slots of the outside inner fastening plate of the opposing tire traction device.

2. The tire traction device according to claim 1, wherein there are three rubber tire cutouts, and three outer fastening plates on each tire traction device.

3. The tire traction device according to claim 2, wherein the three rubber tire cutouts are each approximately 3" wide and ½" to ¾" thick.

4. The tire traction device according to claim 3, wherein the two inner fastening plates and the three outer fastening plates are made from materials selected from the group consisting of aluminum alloy, steel or reinforced plastic.

5. The tire traction device according to claim 4, wherein the three outer fastening plates are 1/11" thick and 3" by 4" in size.

6. The tire traction device according to claim 5, wherein the straps are 3/32" to ¼" thick.

\* \* \* \* \*